(No Model.)

A. A. DAVIS.
TEA KETTLE COOKER.

No. 344,308. Patented June 22, 1886.

WITNESSES:
H. Brown
A. G. Harrison

INVENTOR:
Abbott A. Davis,
by Wright, Brown & Crossley,
attys.

UNITED STATES PATENT OFFICE.

ABBOTT A. DAVIS, OF BOSTON, MASSACHUSETTS, ASSIGNOR OF ONE-HALF TO HARRY DUTTON, OF SAME PLACE.

TEA-KETTLE COOKER.

SPECIFICATION forming part of Letters Patent No. 344,308, dated June 22, 1886.

Application filed January 18, 1886. Serial No. 188,925. (No model.)

*To all whom it may concern:*

Be it known that I, ABBOTT A. DAVIS, of Boston, in the county of Suffolk and State of Massachusetts, have invented certain new and useful Improvements in Tea-Kettle Cookers, of which the following is a specification.

My invention relates to boilers or cookers for culinary purposes, and has for its object to provide an article of that character which may be readily employed in connection with a tea-kettle of any size.

My invention consists in a boiler or cooker adapted to be inserted in the top of an ordinary tea-kettle, and provided with a plurality of collars or flanges of varying sizes or circumferential extent secured thereto, to serve, in connection with the cooker, as a cover for the kettle, all as hereinafter described, and subsequently pointed out in the claims.

Figure 1:
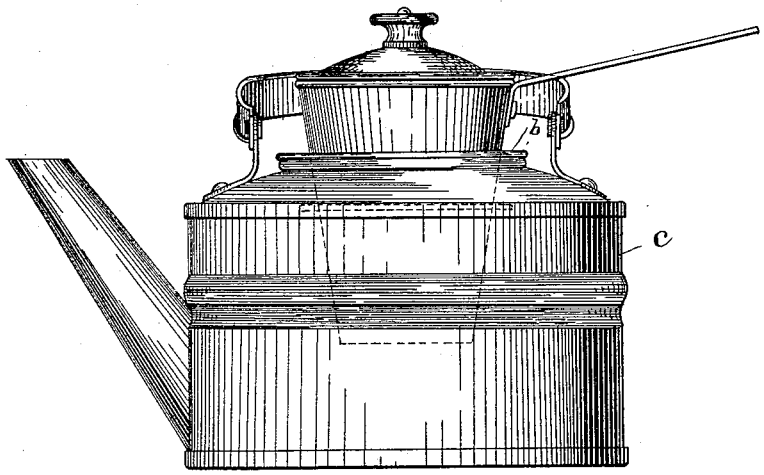
Figure 2:
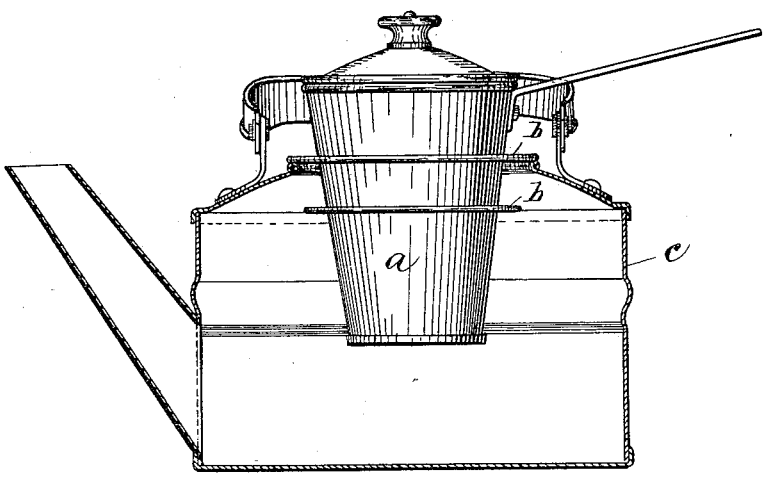

In the drawings hereto annexed, and forming a part of this specification, Figure 1 represents a side elevation of a tea-kettle of ordinary construction having my cooker inserted therein. Fig. 2 is a vertical sectional view of the same.

The same letters of reference refer to the same parts in both figures.

*a* represents the body of the cooker, which is preferably made tapering in form from top to bottom, and is provided with one, two, or more rims or collars, *b*, to serve, in connection with the body of the cooker, as a cover for the tea-kettle *c*, when the former is inserted in the top of the latter. The rims or collars *b* are made of varying widths, the upper rim being wider than that or those below, so that when the cooker is placed in the top of the tea-kettle, if the first collar should prove too small to rest on the top of the kettle and serve as a cover thereto and as a support for the cooker, it will pass inside and permit the next rim to come in contact with the top of the kettle, as clearly shown in Fig. 2. I prefer to solder or otherwise permanently secure these rims to the cooker, though it is obvious that they might be made separate therefrom and secured temporarily thereto by being drawn upon the body and held thereon by friction.

It is obvious that where the body of the cooker is made tapering in form the collars or flanges, while being made different in size with respect to their circumferential extent, may extend the same distance from the side of the cooker; but in instances where the sides of the body of the cooker, viewed in vertical section, are parallel the distance that the collars or flanges extend from the side of the body of the cooker will vary, as well as the extent of their circumferences.

By my invention I provide a cooker which will fit a tea-kettle of any size, and which will not become wedged fast in the top of the kettle, as would be the case if it were not provided with the rims or collars, or were merely provided with a bead around its side.

What I claim is—

1. A tea-kettle cooker having a plurality of collars or flanges of varying circumferential extent surrounding and secured to its body, substantially as and for the purpose described.

2. A tea-kettle cooker having a tapering body and a plurality of collars or flanges of varying circumferential extent surrounding and secured to its body, substantially as and for the purpose described.

In testimony whereof I have signed my name to this specification, in the presence of two subscribing witnesses, this 14th day of January, 1886.

ABBOTT A. DAVIS.

Witnesses:
ARTHUR W. CROSSLEY,
ALBION L. F. MITCHELL.